United States Patent
Metz et al.

(10) Patent No.: US 11,946,469 B2
(45) Date of Patent: Apr. 2, 2024

(54) SCREW SPINDLE PUMP

(71) Applicant: LEISTRITZ PUMPEN GMBH, Nuremberg (DE)

(72) Inventors: Jürgen Metz, Feucht (DE); Kristin Lissek, Fürth (DE); Florian Popp, Nuremberg (DE)

(73) Assignee: LEISTRITZ PUMPEN GMBH, Nuremberg (DE)

( * ) Notice: Subject to any disclaimer, the term of this patent is extended or adjusted under 35 U.S.C. 154(b) by 0 days.

(21) Appl. No.: 18/076,822

(22) Filed: Dec. 7, 2022

(65) Prior Publication Data
US 2023/0184248 A1 Jun. 15, 2023

(30) Foreign Application Priority Data
Dec. 14, 2021 (DE) ...................... 10 2021 133 106.4

(51) Int. Cl.
*F04C 15/00* (2006.01)
*F04C 2/08* (2006.01)
(Continued)

(52) U.S. Cl.
CPC ............ *F04C 15/0096* (2013.01); *F04C 2/16* (2013.01); *F04C 15/06* (2013.01);
(Continued)

(58) Field of Classification Search
CPC ........ F04C 15/0096; F04C 2/16; F04C 15/06; F04C 18/16; F04C 18/165
See application file for complete search history.

(56) References Cited

U.S. PATENT DOCUMENTS 3,790,309 A * 2/1974 Volz ........................ F04C 2/165
417/369
2008/0199340 A1* 8/2008 Rohlfing ................. F04C 2/086
418/201.1
(Continued)

FOREIGN PATENT DOCUMENTS

CN 111836964 A * 10/2020 ................ B22F 5/06
DE 102006049663 A1 5/2008
(Continued)

OTHER PUBLICATIONS

English WO-2019072 by PE2E Mar. 17, 2023.*
(Continued)

*Primary Examiner* — Deming Wan
(74) *Attorney, Agent, or Firm* — LUCAS & MERCANTI, LLP; Klaus P. Stoffel

(57) ABSTRACT

A screw spindle pump having a spindle housing in which a drive spindle and at least one running spindle meshing therewith are received in spindle bores, and an external housing which accommodates the spindle housing, an axial inlet connection and a radial outlet connection being provided on the external housing. The spindle housing has an axial fluid outlet for the fluid conveyed via the drive spindle and the running spindle through the spindle housing, as well as a drive motor having a drive shaft which runs through a bore in a housing wall, which axially closes the interior of the external housing, and which is coupled to the drive spindle. A part of the fluid flowing out of the fluid outlet of the spindle housing flows through the seal-free bore along the drive shaft into the drive motor, cools this drive motor and flows back into the external housing.

14 Claims, 3 Drawing Sheets

(51) Int. Cl.
*F04C 2/16* (2006.01)
*F04C 15/06* (2006.01)
*F04C 18/16* (2006.01)
*B60H 1/00* (2006.01)

(52) U.S. Cl.
CPC ...... *B60H 1/00278* (2013.01); *F04C 15/0061* (2013.01); *F04C 2240/30* (2013.01)

(56) References Cited

U.S. PATENT DOCUMENTS

| | | | |
|---|---|---|---|
| 2020/0300202 A1* | 9/2020 | Becker | H02K 11/40 |
| 2022/0049697 A1 | 2/2022 | Pawellek | |
| 2022/0333597 A1* | 10/2022 | Pawellek | F04C 15/0007 |

FOREIGN PATENT DOCUMENTS

| | | | | |
|---|---|---|---|---|
| DE | 102017218287 A1 | 4/2019 | | |
| DE | 102018131587 A1 | 6/2020 | | |
| DE | 102019103470 A1 * | 8/2020 | | F04C 15/0096 |
| DE | 102019118086 A1 | 1/2021 | | |
| DE | 102016100535 B4 | 11/2021 | | |
| EP | 2322803 A2 | 5/2011 | | |
| WO | WO-2019072892 A1 * | 4/2019 | | F02M 37/08 |

OTHER PUBLICATIONS

English DE-102019103470 by PE2E Mar. 17, 2023.*
English CN-111836964 by PE2E Mar. 17, 2023.*
European Patent Office issued a Search Report dated May 12, 2023 regarding parallel European Patent Application No. 22209994.7, 11 Pages.

* cited by examiner

SCREW SPINDLE PUMP

CROSS-REFERENCE TO RELATED APPLICATIONS

The present application claims priority of DE 10 2021 133 106.4, filed Dec. 14, 2021, the priority of this application is hereby claimed, and this application is incorporated herein by reference.

BACKGROUND OF THE INVENTION

The invention relates to a screw spindle pump, having a spindle housing in which a drive spindle and at least one running spindle meshing therewith are received in spindle bores, and having an external housing which accommodates the spindle housing, an axial inlet connection and a radial outlet connection being provided on said external housing.

Such a screw spindle pump serves for conveying a fluid and is used in very different fields. The conveyance of a fuel or any other operating fluid or supply fluid, for example a coolant or cleaning agent, of a motor vehicle can be cited by way of example. Such screw spindle pumps can also be used in other agricultural vehicles or aircraft, such as for example airplanes or drones, wherein the possibilities for use are not limited thereto. Such a screw spindle pump has a spindle housing which can also be denoted as an internal housing in which at least two spindles, namely a drive spindle and a running spindle, are received in respective spindle bores which intersect one another, however. The drive spindle and the running spindle have in each case a spindle profile, wherein the two spindle profiles mesh with one another. The drive spindle is connected to a drive motor and can be actively rotated, which also leads to a rotation of the running spindle meshing therewith. Due to the rotation of the spindles, a conveying volume is displaced continuously in the direction of the spindle longitudinal axis in which the fluid is conveyed. The spindle housing is received in an external housing which, for example, can be pot-shaped and can be closed via an axial wall on one side, while the drive motor, for example, is flange-mounted on the other side. It is also conceivable, however, that the external housing has multiple parts and has a cylindrical base part which is closed on the one side via a cover, while in turn the drive motor is flange-mounted on the other side. The external housing has an axial inlet connection, i.e. a corresponding connection piece, a supply line being able to be connected thereto and the suction side being defined thereby. The external housing also has a radial outlet connection, i.e. a corresponding outlet connection piece, the pressure side being defined thereby. Here the conveyed fluid exits at the respective pressure which can be generated by the pump. Such a pump is disclosed, for example, in DE 10 2018 131 587 A1.

In the known pump, an axial inlet connection, via which the supply takes place, is provided eccentrically on the external housing. The fluid thus flows initially at the side to an axial inlet opening of the spindle housing, the fluid is conveyed through said inlet opening and leaves the spindle housing at a radial housing bore, from where it flows via a narrow connecting space between the spindle housing and the external housing to the radial outlet connection. In other words, the pressurized fluid leaves the spindle housing radially and is ultimately discharged directly via the outlet connection.

SUMMARY OF THE INVENTION

The object of the invention is to specify a screw spindle pump which is improved relative thereto.

To achieve this object, according to the invention a screw spindle pump is provided as described in the introduction, wherein the spindle housing has an axial fluid outlet for the fluid conveyed via the drive spindle and the running spindle through the spindle housing, as well as having a drive motor comprising a drive shaft which runs through a bore in a housing wall, which axially closes the interior of the external housing, and which is coupled to the drive spindle, wherein a part of the fluid flowing out of the fluid outlet of the spindle housing flows through the seal-free bore along the drive shaft into the drive motor, cools this drive motor and flows back into the external housing.

The screw spindle pump according to the invention is characterized in that, on the one hand, the conveyed pressurized fluid is provided with an additional cooling function and in that, on the other hand, the pump does not have a rotationally stressed sealing element which is susceptible to wear.

According to the invention, the spindle housing has an axial fluid outlet, in other words the fluid enters axially into the spindle housing and also exits axially therefrom. The drive motor is located in the discharge direction, said drive motor having a drive shaft which runs into the interior of the external housing through a housing wall axially closing the external housing, respectively the pump housing, on this side, through a bore provided therein. There it is coupled via a suitable coupling device to the drive spindle for driving said drive spindle. The housing wall, on the one hand, axially closes the pump housing but leaves a small annular gap open, i.e. the bore diameter is slightly larger than the drive spindle diameter. Due to this annular gap, therefore, a small part of the pressurized conveyed fluid can flow axially along the drive shaft out of the pump housing into the housing of the drive motor, where it is correspondingly distributed according to the flow path, and in this manner cools the motor in the region of the surfaces or motor elements along which or around which the fluid flows. The fluid circulates in the motor housing and flows back again along the drive shaft into the external housing, wherein however in principle a return flow can also take place via one or more further small through-openings in the housing wall. In other words, an active motor cooling can take place via this part of the fluid, and thus the drive motor is a wet motor, wherein this active cooling acts advantageously on the efficiency, respectively the motor output.

As described, the fluid flows at least along the drive shaft through the bore, respectively the annular gap, between the bore inner wall and the drive shaft axially into the motor housing, or can also flow thereby back into the external housing. In other words, a seal in the form of a shaft sealing ring is not received in the bore, respectively in the annular gap, so that accordingly a rotationally stressed sealing element which is susceptible to wear over time is not provided in this region. In other words, apart from a corresponding bearing and optionally a seal of the drive shaft in the motor housing itself, the drive shaft is not guided in a radially sealed manner in the transition to the external housing, respectively in the external housing.

Moreover, the two other rotational elements in addition to the drive shaft, namely the drive spindle and the running spindle, are not sealed via rotationally stressed sealing elements, i.e. none of the rotating elements of the screw spindle pump is sealed on or in the external housing or the spindle housing by means of a rotationally stressed sealing element. Any wear of the sealing element can be advantageously eliminated thereby. The only sealing elements are static sealing elements which axially and/or radially seal the transition, for example, between the external housing and the motor housing, or the transition between two external housing components and the like. During operation, however, these sealing elements are not mechanically stressed in a variable manner and thus are not susceptible to wear.

As described, the drive shaft coming from the drive motor extends through a bore in a housing wall axially closing the external housing. Different variants relative to the arrangement, respectively configuration, of the housing wall are thus conceivable. According to a first alternative, the drive motor can be directly placed on the external housing, wherein a housing of the drive motor has a front wall forming the housing wall. In other words, the housing of the drive motor in which the corresponding motor components, such as the rotor and stator and the electronics, etc. are received, is provided with an axial housing wall in which the corresponding bore, through which the drive shaft engages, is configured. The drive motor is now directly positioned on the external housing and screwed thereto, so that the housing wall on the drive motor side forms the axial external housing closure. As a result, the proportion of cooling fluid flows directly into the drive motor through the housing wall on the drive motor side.

Alternatively, it is conceivable that a plate-shaped intermediate component which is placed on the external housing and forms the housing wall is provided, wherein the drive motor is placed on the intermediate component. In this variant, an intermediate component is placed between the external housing and the drive motor, respectively the motor housing, which ultimately forms a type of mounting interface.

This plate-shaped intermediate component comprises the housing wall with the bore, the drive shaft on the motor side engaging therethrough. The motor housing thus can ultimately be designed to be open on its side facing the intermediate plate or, when for example only the electronics are to be cooled, it can be designed with a corresponding closure wall, the electronics being provided to the rear thereof, wherein the fluid flows onto this closure wall for cooling purposes, or the like. The intermediate component has, for example, corresponding through-bores through which fastening screws can be passed, the external housing and the motor housing which have corresponding bores being guided thereby, so that all three parts can be axially screwed together by means of common fastening elements.

As already described in the introduction, for example in the pump disclosed in DE 10 2018 131 587 A1, only one radial housing bore is on the spindle housing, from where the pressurized conveyed fluid flows radially into a narrow connecting space between the spindle housing and the external housing and from there to the radial outlet connection. In the region of this radial housing opening of the spindle housing and the narrow connecting space, i.e. the pressure side, the conveyed fluid is present at a correspondingly high pump pressure so that the spindle housing, respectively in the intermediate housing region in which the narrow connecting space is provided, is locally subjected to load by a high pressure. In the screw spindle pump according to the invention, a radial outlet is not provided out of the spindle housing, but rather an axial outlet, so that the fluid component serving for cooling purposes can flow axially into the motor housing. The remaining fluid volume has to be conducted to the radial outlet connection provided on the external housing, for which purpose it has to be deflected. According to an expedient development, advantageously the axial fluid outlet for the fluid conveyed via the drive spindle and the running spindle through the spindle housing communicates with a fluid chamber which is configured between the spindle housing and the external housing and which extends over 360°, said fluid chamber in turn communicating with the radial outlet connection. In the screw spindle pump according to the invention, advantageously a radial fluid chamber is provided between the spindle housing and the external housing, said fluid chamber running over 360° around the spindle housing and thus surrounding this spindle housing as an annular chamber. This annular fluid chamber is located on the pressure side and thus is a pressure chamber, since the pressurized fluid exiting from the spindle housing is supplied thereto. This fluid exits axially from the spindle housing, i.e. a correspondingly large axial fluid outlet opening is provided on the spindle housing. Any radial bores or similar configurations are not provided, as already described above. Since, as described above, the radial fluid chamber or pressure chamber encompasses the internal housing fully, i.e. circulating over 360°, particularly advantageously the corresponding pump pressure is applied on all sides around the internal housing, i.e. virtually symmetrical pressure ratios are ultimately provided on the spindle housing, respectively apply a load thereto. As a result, on the one hand, local excess pressures, as result of the asymmetrical pressure distribution as known from the prior art, are avoided. On the other hand, the resulting, albeit slight, deformations of the spindle housing resulting from the fluid pressure which also builds up in the spindle housing are avoided, since a load is applied radially outwardly on the spindle housing by the fluid pressure prevailing in the fluid chamber, as described above, and thus the spindle housing is stabilized. In other words, according to the invention a fluid jacket, which forms a corresponding radial pressure which stabilizes the internal housing, is produced. This is advantageous, in particular, when the spindle housing is produced from a slightly more flexible material, for example a plastics, which can certainly be the case in smaller screw spindle pumps, which can also generate correspondingly high pump pressures, however.

The fluid chamber provided according to the invention extends as described above, on the one hand, over 360° around the spindle housing. On the other hand, the fluid chamber should encompass the spindle housing over at least a part of its axial length.

The fluid chamber should in this case extend over at least half the length of the spindle bore, respectively the spindle housing, optionally also a greater length, for example over ⅔ of the length of the spindle bores, respectively the spindle housing. It is also conceivable that the fluid chamber extends over the entire length of the spindle bores or the spindle housing.

The spindle housing has to be correspondingly mounted in the external housing, as naturally the fluid chamber, when viewed axially, also has to be correspondingly sealed. Various possibilities are conceivable therefor. According to a first alternative, the fluid chamber can be axially defined via two radial flanges, wherein the one radial flange has a plurality of axial through-openings, the fluid chamber being connected thereby to the fluid outlet of the spindle housing. The spindle housing is received in the external housing and is radially supported via these radial flanges. The radial flange provided on the pressure side has corresponding through-openings which permit the fluid axially flowing out of the spindle housing to be able to flow axially, after its deflection, approximately back into the fluid chamber. A seal on this side is naturally required. The other radial flange which is provided approximately on the suction side, however, serves for the seal, one or more suitable sealing means being provided therefor in this region, the spindle housing being sealed thereby toward the external housing, so that the fluid chamber is also sealed on this suction side end.

As an alternative to the configuration of two radial flanges, it is also conceivable to define the fluid chamber axially via one radial flange, on the one hand, which has a plurality of axial through-openings, the fluid chamber being connected thereby to the fluid outlet of the spindle housing, and, on the other hand, via a cover component. Here only one radial flange which is provided on the pressure side is used, said radial flange also having axial through-openings in order to permit the return flow of the conveyed pressurized fluid into the fluid chamber, as in the above-described embodiment. The other side of the fluid chamber is closed, respectively defined, via a cover component positioned onto the cylindrical base part of the external housing, the inlet connection being provided on said cover component. While in the first variant the radial flange on the suction side defines the chamber, in the second variant the chamber is axially defined via the cover component.

In order to deflect the fluid axially flowing out of the spindle housing to the fluid chamber, according to a first variant the front wall of the housing of the drive motor can have one or more deflection cavities which deflect the fluid coming from the fluid outlet to the fluid chamber. In this variant, the drive housing is provided with the housing wall, which axially closes the external housing, wherein the housing wall is provided with one or more deflection cavities which cause the radial and axial deflection to the fluid chamber radially surrounding the spindle housing.

In the event that an intermediate component is used between the external housing and the motor housing, this intermediate component can have one or more deflection cavities which deflect the fluid to the fluid chamber. Here, as set forth above, the intermediate component comprises the housing wall which axially closes the external housing, which is why in this case the intermediate component has to be provided with the deflection cavity or the deflection cavities.

The deflection cavity is preferably an annular groove or a pot-like recess which is designed to be rounded in the region of the groove base or recess base. In other words, the housing wall is bulged in an approximately spherical cap-shaped manner, so that a corresponding groove or recess into which the fluid initially can flow axially is formed, said groove or recess extending radially outwardly so that the fluid is guided radially outwardly. Since this recess communicates with the fluid chamber, whether directly or whether by corresponding through-openings in a radial flange on the spindle housing side, the fluid can then flow back axially into the fluid chamber and be distributed there before it flows to the fluid outlet. This concave, respectively spherical cap-shaped, recess thus permits a fluid deflection on all sides and a symmetrical fluid flow into the fluid chamber. Naturally, the groove or recess can also be divided into individual groove portions or recess portions via axially and radially extending webs, when such webs have to be provided for stabilizing purposes, for example. By the rounded design of the groove base or recess base, in addition to the targeted flow guidance, it is also ensured that in this case it does not lead to the development of any flow noise, since no corners or edges are provided in the groove region or recess region, which might be disadvantageous in terms of flow technology.

As described, the fluid jacket or pressure jacket produced according to the invention via the fluid chamber permits the targeted generation of a radial stabilizing pressure on the spindle housing on all sides, in order to avoid increasing the tolerances on the spindle housing or any slight geometric changes due to operation. This is the case, in particular, when the spindle housing is produced from plastics, as can be provided according to the invention. Additionally or alternatively, it is also conceivable that the external housing and the intermediate component or, if provided, also the cover component as an axial external housing closure are produced from plastics. In other words, it is possible to produce all housing-relevant components from plastics as the possibility also exists in principle of producing even the spindles from plastics. Preferably, however, at least these spindles are made of metal.

The screw spindle pump can be a two-spindle pump which has only one drive spindle and a running spindle positioned to the side thereof. Alternatively, it is also conceivable that the screw spindle pump is a three-spindle pump with a central drive spindle and two running spindles arranged on either side thereof, offset by 180°. Thus different types of pump can be produced in the manner according to the invention.

It can also be provided that the inlet connection is arranged in alignment with a central axis of the spindle pack comprising the drive spindle and the one or the two running spindles. In other words, the inlet connection piece is arranged approximately in the axial extension of the central axis of the spindle pack. In a two-spindle screw spindle pump, this central axis is ultimately located centrally between the drive spindle and the running spindle. In a three-spindle pump, this central axis is located in the longitudinal axis of the central drive spindle. This embodiment makes it possible in a particularly advantageous manner that the inflowing, axially suctioned fluid inside the external housing does not initially have to be deflected toward the spindle housing, which is potentially associated with flow noise. Instead, a direct axial inflow into the spindle housing is possible.

In addition to the screw spindle pump itself, the invention also relates to the use of a screw spindle pump of the type described in the introduction in a motor vehicle for conveying an operating fluid. This operating fluid can be of any type. For example, it can be a cleaning fluid, for example a windshield cleaning fluid, which is conveyed via the pump. Alternatively, and a preferred intended use according to the invention, is the use of the screw spindle pump as a coolant pump, a coolant being conveyed thereby. The coolant can be any fluid coolant. The use relates, in particular, to the use for conveying a coolant serving for cooling an energy storage device. Such an energy storage device is increasingly used in electromotively driven motor vehicles and is provided in the form of a correspondingly dimensioned traction battery or drive battery. This energy storage device requires corresponding cooling by means of a coolant, which can be easily conveyed in the required quantity in a simple manner via the screw spindle pump according to the invention.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

DETAILED DESCRIPTION OF THE INVENTION

Figure 1:
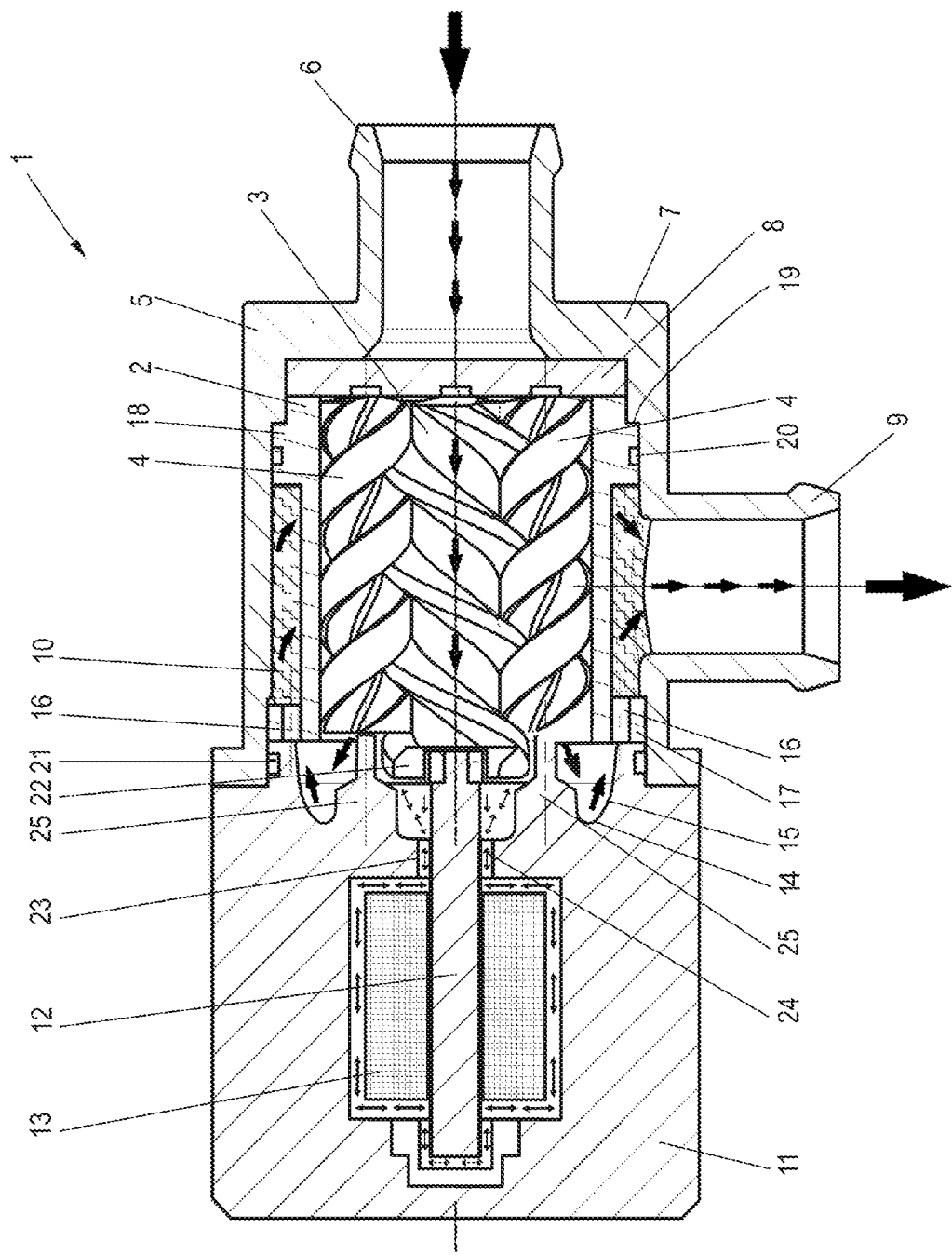
FIG. 1 shows a schematic diagram of a screw spindle pump according to the invention of a first embodiment in a sectional view.

FIG. 1 shows a screw spindle pump 1 according to the invention in a first embodiment. This screw spindle pump comprises a spindle housing 2 in which, in the example shown, three spindles, namely a drive spindle 3 and two running spindles 4 positioned offset to the side by 180° adjacent to the other spindle, are received in corresponding spindle bores intersecting one another. As FIG. 1 shows, all of the spindles 3, 4 have corresponding spindle profiles which engage in one another and mesh with one another.

The spindle housing 2 is received in a pot-like external housing 5, an inlet connection 6, i.e. a corresponding connection piece, which is positioned centrally and in alignment with the longitudinal axis of the drive spindle 3 being provided thereon. Relative to the external housing 5 or the radial flange 7 thereof, the spindle pack consisting of the drive spindle 3 and the running spindles 4 is axially supported via a support element, in this case a feather key 8. The feather key 8 is, for example, clampingly held in the external housing 5 or engages in radial recesses in the external housing 5.

A radial outlet connection 9, also here a connection piece, is also provided on the external housing 5, which for example is produced from plastics, the pressurized fluid suctioned via the inlet connection 6 exiting again radially via said outlet connection.

As FIG. 1 shows by way of illustration, the spindle housing 2, in addition to its components, is received in the interior of the pot-shaped external housing 5. A fluid chamber 10 circulating over 360° is provided between the external wall of the spindle housing 2 and the internal wall of the external housing 5, said fluid chamber as FIG. 1 shows extending over more than half the length of the spindle housing 2, respectively the spindle bores. The pressurized fluid exiting at the axial fluid outlet of the spindle housing passes into this fluid chamber 10, i.e. the axial fluid outlet on the left-hand end of the spindle housing 2 communicates with the fluid chamber 10. This fluid chamber communicates in turn with the outlet connection 9.

Also provided is a drive motor 11 which is shown here only in principle and which is positioned in this case directly on the external housing 5 and is fastened there by means of suitable fastening screws. The drive motor 11 is coupled via a coupling element 22 to the drive spindle 3 by a drive shaft 12 which is connected to a rotor 13 of the drive motor 11 which is designed as an electric motor and which is arranged in a stator, not shown in more detail here, so that this drive spindle can be actively rotated via the drive motor 11, so that the entire spindle pack rotates and axially conveys the fluid suctioned via the inlet connection 6.

As described, the fluid exits from the axial fluid outlet of the spindle housing, which in this embodiment is simply open axially on the suction side end and the pressure side end. So that the exiting fluid can pass into the fluid chamber 10, which is axially set back as relates to the direction of conveyance, in the example shown a deflection cavity 14 is provided, said deflection cavity in the example shown being configured directly on the housing wall 15 of the housing of the drive motor 11 facing the spindle housing 2. This housing wall 15 forms the axial closure of the external housing 5, and thus closes this external housing on this side. The deflection cavity 14 is configured, for example, as a circulating annular groove or as a pot-like, spherical cap-shaped recess and is designed to be bulged or rounded on the bottom side, so that the fluid which flows in approximately centrally is deflected radially outwardly to the side and is conveyed back so that it can flow into the fluid chamber 10 via corresponding through-openings 16 which are configured on a radial flange 17 of the spindle housing 2.

The fluid chamber 10 on the suction side end is axially defined by a radial flange 18 of the spindle housing 2. This radial flange is axially supported, on the one hand, on a housing shoulder 19 of the external housing 5. On the other hand, said radial flange extends as far as the internal wall of the external housing 5 and is radially sealed relative thereto via a sealing element 20 so that the fluid chamber 10 is closed and sealed at this end. A radial flange 17 is also provided on the opposing pressure side end, the already described through-openings 16 being configured therein however, so that the fluid chamber 10 is open toward this pressure side and the pressurized fluid can flow via the deflection cavity 14 into the fluid chamber. The seal on this side is implemented between the external housing 5 and the motor housing via a suitable sealing element 21 which is configured on an annular flange of the motor housing engaging approximately axially in the external housing 5 and which provides a radial seal.

During operation, the drive spindle 3 is rotated via the drive motor 11. The fluid suctioned via the inlet connection 6 is axially conveyed by the spindle profiles of the spindles 3, 4 engaging in one another, resulting in axially displaced conveying volumes which permit a conveyance of the fluid along the spindle pack.

On the pressure side end of the spindle housing 2 the fluid exits axially, which is advantageous regarding an operation with as little noise as possible, since no noticeable flow noise is associated therewith. The fluid then enters directly into the deflection cavity 14, for example an annular groove or concave recess as described, via which the fluid is radially deflected outwardly and axially conducted back, i.e. is deflected counter to the direction of conveyance of the spindle pack. The fluid enters via the through-openings 16 into the fluid chamber 10 and via these through-openings into the outlet connection 9 where it is discharged.

The pump pressure prevails in the fluid chamber 10, i.e. the outlet pressure which can be generated via the screw spindle pump 1 is applied in this fluid chamber 10 surrounding the spindle housing on all sides. This pressure acts radially on the spindle housing 2 on all sides, provided this spindle housing is encompassed by the fluid chamber 10, which also can be denoted as the pressure chamber. As described, this fluid chamber 10 extends over at least half the length of the spindle housing 2, preferably even a slightly greater length, so that the best possible stabilization of the spindle housing 2 is provided relative to any pressure-induced geometric changes, respectively tolerance shifts. This applies, in particular, when the spindle housing is produced from plastics, i.e. from a slightly more flexible material relative to metal.

As described, the conveyed fluid exits axially from the spindle housing 2 and passes into the deflection cavity 14, and thus flows against the housing wall 15. While the largest part is deflected and discharged, a small part of the pressurized fluid passes into the drive motor 11, as indicated in FIG. 1, for cooling purposes. In order to permit this, a fluid flow is possible between the drive spindle 12 and the internal wall of a bore 23 which is configured in the housing wall 15. To this end, the internal diameter of the bore 23 is slightly larger than the external diameter of the drive shaft 12, resulting in an annular gap 24 through which the fluid flowing in axially from the right in FIG. 1 can flow along the drive shaft 12 through the housing wall 15 into the interior of the motor housing, respectively the drive motor 11. If a corresponding fluid path is designed, or respectively permits it, the fluid flows past corresponding surfaces or components to be cooled and also flows back again through the annular gap 24 into the region of the deflection cavity 14, so that ultimately it passes out of this deflection cavity into the fluid chamber 10 and is discharged. In other words, an active cooling of the drive motor 11 is possible via the conveyed cooling fluid, which in any case exits from the spindle housing 2 with an axial flow direction and flows with this flow direction in the axial extension through the annular gap 24 and passes into the motor housing, respectively the drive motor 11. This active cooling is very advantageous for the motor operation, respectively the available motor output and the efficiency.

The drive motor 11 is shown here only in a stylized manner. The drive motor has a motor housing, for example made of metal or plastics, which encapsulates the drive motor per se and the housing wall 15 is part of said motor housing. This housing wall is designed to be recessed in an approximately spherical cap-shaped manner, in order to form the deflection cavity 14, wherein support elements 25 can be integrally formed on the base of this recess, said support elements running axially to the spindle housing 2, and the two running spindles 4 being axially supported on said support elements 25. On the other side, the support is provided via the feather key 8. The drive spindle is additionally supported on the feather key 8, but also on the drive shaft 12.

In the interior of the drive motor 11, depending on the cooling requirement, a corresponding cooling line can be formed for guiding the coolant. It is conceivable that the cooling fluid flows along a plate or the like, corresponding electronic components being arranged to the rear thereof. A flow through the rotor-stator arrangement, as indicated in the present case by way of example, is also conceivable. In other words, the guidance of the fluid through the drive motor 11 is designed as needed and according to the cooling requirement.

In FIG. 1 the corresponding flow arrows which represent the fluid flow are illustrated. Coming from the right, the fluid enters via the inlet connection 6 on the suction side and passes into the spindle housing 2, which is open axially on this side, to the spindle pack which rotates via the drive motor 11. The fluid, as shown by the arrows, is axially displaced through the spindle pack and exits at the outlet opening of the spindle housing 2 which is also axially open on the pressure side. The largest part of the fluid, as shown by the deflecting arrows, is deflected radially outwardly and passes into the fluid chamber where it forms the corresponding stabilizing pressure on the spindle housing 2. From there it then passes into the outlet connection 9 and is removed. A further part, as indicated by the flow arrows, passes through the annular gap 24 into the drive motor 11, circulates therethrough and also flows back again through the annular gap 24, wherein this fluid component also finally passes into the fluid chamber 10 and is discharged.

Figure 2:
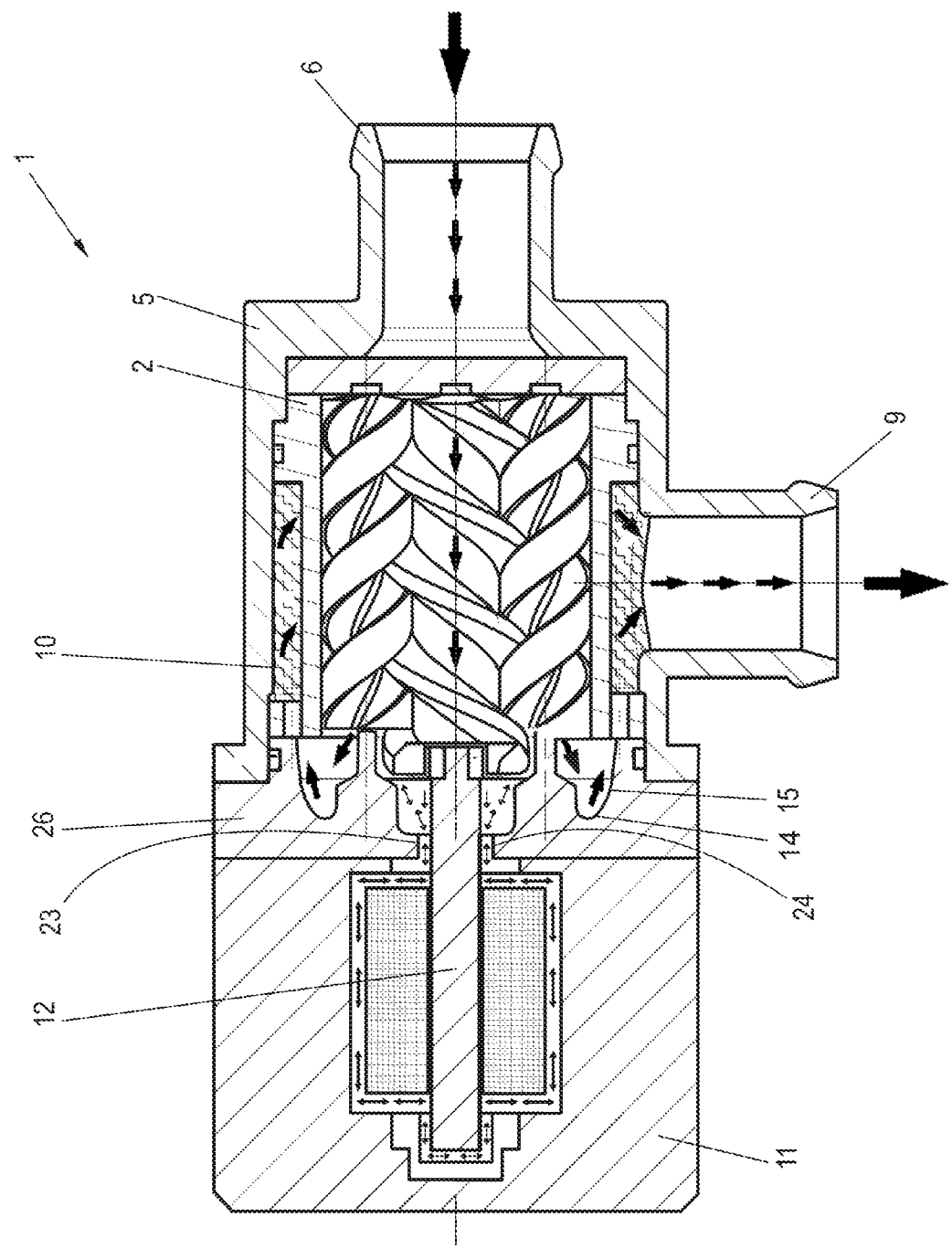
FIG. 2 shows a schematic diagram of a screw spindle pump according to the invention of a second embodiment in a sectional view.

FIG. 2 shows a second embodiment of a screw spindle pump 1 according to the invention in a schematic diagram. The construction is ultimately identical to that according to FIG. 1, and also the principal function thereof. The only difference here is that a plate-like intermediate component 26 is provided between the drive motor 11 and the external housing 5, wherein all three parts, namely the external housing 5, intermediate component 26 and drive motor 5, respectively the motor housing, are axially connected together via common fastening means. In this embodiment, the intermediate component 26 forms the housing wall 15 which axially closes the external housing 5 on this side and on which the deflection cavity 14 is configured. The intermediate component 26, respectively its housing wall 15, is also provided here with a corresponding bore 23 so that an annular channel 24 is also configured here between the drive spindle 12 and the bore inner wall, in this case the fluid flowing axially out of the spindle housing 2 can also pass through said annular channel into the interior of the motor housing, respectively the drive motor 11, and circulate therein for cooling purposes, and can also flow back again. Finally, together with the fluid otherwise generally conveyed back via the deflection cavity 14, the fluid passes into the fluid chamber 10 from where it then drains out via the outlet connection 9.

In other words, in contrast to the design according to FIG. 1 here an intermediate component 26 is connected in an approximately sandwich-like manner between the external housing 5 and the drive motor 11, wherein the external housing closure is implemented via this intermediate component 26. As a result, the drive motor 11 can be designed to be open on the side facing the intermediate component 26, depending on requirements, since as mentioned above the external housing closure is implemented via the intermediate component 26. As a result, the annular gap 24 is formed solely in the intermediate component 26, but not on or in the motor housing.

The configuration of the deflection cavity 14 of the intermediate component 26 can be identical to the deflection cavity 14 according to the exemplary embodiment according to FIG. 1. In this case, the deflection cavity 14 is also preferably designed as a pot-like recess in which, for example, the two support elements 25 are integrally formed. As in the case of the spindle housing 2, the intermediate component 26 can also be a plastics component, as in the case of the external housing 5.

Figure 3:
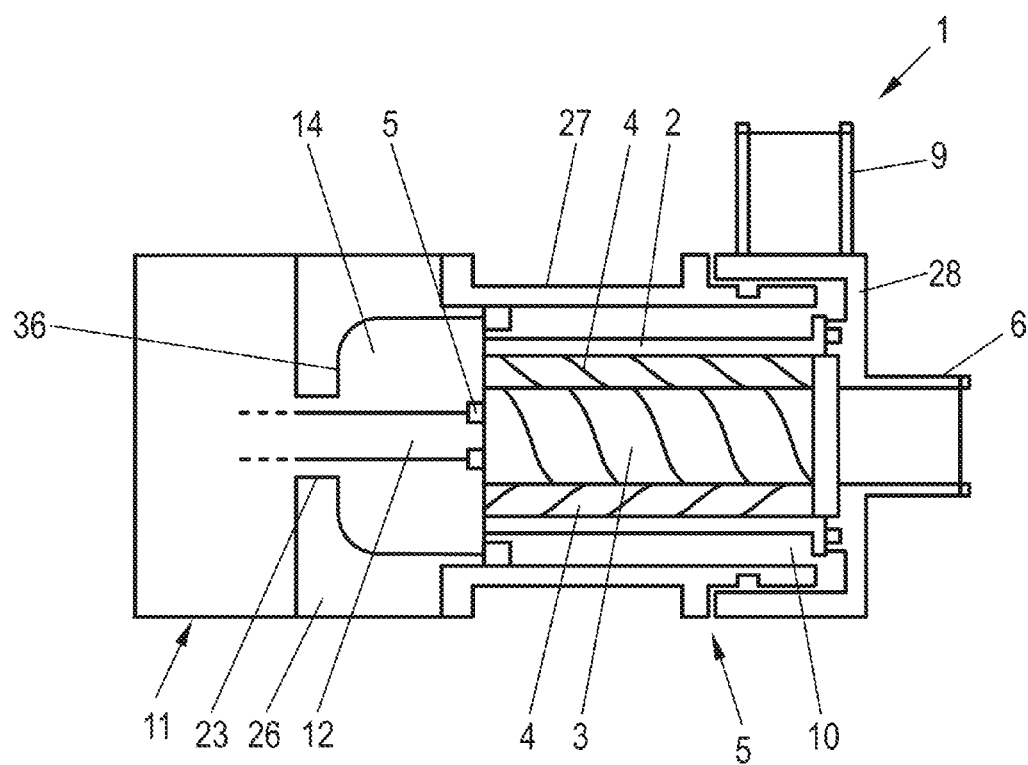
FIG. 3 shows a schematic diagram of a screw spindle pump according to the invention of a third embodiment in a sectional view.

FIG. 3 finally shows a schematic diagram of a third embodiment of a screw spindle pump according to the invention 1 with a spindle housing 2 and a drive spindle 3 and the two running spindles 4 received therein. The spindle housing 2 is also received in this case in an external housing 5, which is designed here in two parts, however. On the one hand, it consists of an approximately hollow-cylindrical base part 27 which is axially closed on the suction side via a cover component 28, the inlet connection 6, on the one hand, and the outlet connection 9, on the other hand, being provided thereon. The cover component 28 is positioned on the base part 27 and encompasses this base part radially, wherein corresponding sealing means, not shown in more detail, are provided in this region.

Otherwise, an intermediate component 26 which forms a housing wall 15 is also provided in this embodiment according to the invention, the deflection cavity 14 also being configured therein. The drive motor 11, only shown here in a stylized manner, engages with its drive shaft 12 through a bore 23 in the housing wall 15 so that an annular gap 24 is also configured here, said annular gap permitting the axial fluid to flow out of the spindle housing 2 into the drive motor 11 and back again for cooling purposes. A corresponding fluid chamber 10 is also provided here, said fluid chamber creating a pressure jacket around the spindle housing 2 and communicating, on the one hand, with the fluid outlet of the spindle housing 2 and, on the other hand, with the outlet connection 9. The principal function of this screw spindle pump 1, shown here only in principle, corresponds to the above embodiments, the only difference here being the construction of the external housing 5 as a two-part external housing.

While specific embodiments of the invention have been shown and described in detail to illustrate the inventive principles, it will be understood that the invention may be embodied otherwise without departing from such principles.

We claim:

1. A screw spindle pump, having a spindle housing in which a drive spindle and at least one running spindle meshing therewith are received in spindle bores, and having an external housing which accommodates the spindle housing, an axial inlet connection and a radial outlet connection being provided on said external housing, wherein the spindle housing has an axial fluid outlet for the fluid conveyed via the drive spindle and the running spindle through the spindle housing, as well as having a drive motor comprising a drive shaft which runs through a seal-free bore in a housing wall, which axially closes the interior of the external housing, and which is coupled to the drive spindle, wherein a part of the fluid flowing out of the fluid outlet of the spindle housing flows through the seal-free bore along the drive shaft into the drive motor, cools this drive motor and flows back into the external housing.

2. The screw spindle pump according to claim 1, wherein the drive motor is directly placed on the external housing, wherein a housing of the drive motor has a front wall forming the housing wall.

3. The screw spindle pump according to claim 1, wherein a plate-shaped intermediate component which is placed on the external housing and forms the housing wall is provided, wherein the drive motor is placed on the intermediate component.

4. The screw spindle pump according to claim 3, wherein the axial fluid outlet for the fluid conveyed via the drive spindle and the running spindle through the spindle housing communicates with a fluid chamber which is configured between the spindle housing and the external housing and which extends over 360°, said fluid chamber in turn communicating with the radial outlet connection.

5. The screw spindle pump according to claim 4, wherein the fluid chamber extends over at least half the length of the spindle bore.

6. The screw spindle pump according to claim 4, wherein either the fluid chamber is axially defined via two radial flanges, wherein the one radial flange has a plurality of axial through-openings, the fluid chamber being connected thereby to the fluid outlet of the spindle housing, or the fluid chamber is axially defined via one radial flange, on the one hand, which has a plurality of axial through-openings, the fluid chamber being connected thereby to the fluid outlet of the spindle housing and, on the other hand, via a cover component.

7. The screw spindle pump according to claim 4, wherein the front wall of the housing of the drive motor has one or more deflection cavities which deflect the fluid coming from the fluid outlet of the spindle housing to the fluid chamber.

8. The screw spindle pump according to claim 7, wherein the one deflection cavity is an annular groove or a pot-like recess which is designed to be rounded in the region of the groove base or recess base.

9. The screw spindle pump according to claim 4, wherein the intermediate component has one or more deflection cavities which deflect the fluid coming from the fluid outlet of the spindle housing to the fluid chamber.

10. The screw spindle pump according to claim 1, wherein the spindle housing, the external housing and/or the intermediate component are made of plastics.

11. The screw spindle pump according to claim 1, wherein a central drive spindle and two running spindles arranged on either side thereof are provided.

12. The screw spindle pump according to claim 1, wherein the inlet connection is arranged in alignment with a central axis of the spindle pack comprising the drive spindle and the one or the two running spindles.

13. A use of a screw spindle pump according to claim 1 in a motor vehicle for conveying an operating fluid.

14. The use according to claim 13, wherein the screw spindle pump is used as a coolant pump, in particular for conveying a coolant serving for cooling an energy storage device.

* * * * *